(12) United States Patent
Santos et al.

(10) Patent No.: US 9,225,442 B2
(45) Date of Patent: Dec. 29, 2015

(54) MANAGING ANTENNAS ON AN ACCESS POINT IN A WIRELESS NETWORK

(75) Inventors: Curtis Santos, Santa Clara, CA (US); Rudolph Maske, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 343 days.

(21) Appl. No.: 13/401,772

(22) Filed: Feb. 21, 2012

(65) Prior Publication Data

US 2013/0215876 A1 Aug. 22, 2013

(51) Int. Cl.
*H04W 84/02* (2009.01)
*H04B 17/12* (2015.01)
*H01Q 1/24* (2006.01)
*H01Q 3/24* (2006.01)
*H04W 88/08* (2009.01)

(52) U.S. Cl.
CPC .............. *H04B 17/12* (2015.01); *H01Q 1/246* (2013.01); *H01Q 3/24* (2013.01); *H04W 88/085* (2013.01)

(58) Field of Classification Search
CPC ..... H04W 84/02; H04W 84/12; H04W 84/18; H01Q 1/243
USPC ........ 370/338, 328, 310; 455/575.7, 101, 134
See application file for complete search history.

(56) References Cited

U.S. PATENT DOCUMENTS

| 6,654,384 | B1* | 11/2003 | Reza et al. .................... 370/469 |
| 2005/0074123 | A1* | 4/2005 | Cromer et al. ................ 380/270 |
| 2007/0093282 | A1* | 4/2007 | Chang et al. ................ 455/575.7 |
| 2007/0141997 | A1* | 6/2007 | Wulff et al. .................... 455/78 |
| 2009/0079268 | A1* | 3/2009 | Cook et al. .................... 307/104 |
| 2010/0283585 | A1* | 11/2010 | Anderson et al. .......... 340/10.42 |

FOREIGN PATENT DOCUMENTS

| EP | 2003731 | 12/2008 |
| WO | 03049228 | 6/2003 |

OTHER PUBLICATIONS

Extended European Search Report, dated May 14, 2013 for related EP application No. 12186246.0.

* cited by examiner

*Primary Examiner* — Jamal Javaid
(74) *Attorney, Agent, or Firm* — IP Spring

(57) ABSTRACT

Embodiments include a method for managing connections to one or more antennas in a wireless network. In one embodiment, a method includes receiving antenna information at a wireless controller from an antenna. Configuration information is accessed from a database coupled to the wireless controller, where this information includes suitable antenna characteristics for use with the wireless network. The received antenna information and the configuration information are compared, and instructions are provided to cause the antenna to be connected to or disconnected from the wireless network based on the comparison between the antenna information and the configuration information.

21 Claims, 5 Drawing Sheets

MANAGING ANTENNAS ON AN ACCESS POINT IN A WIRELESS NETWORK

BACKGROUND

Wireless local area networks (WLANs) are ubiquitous in today's corporate and campus environments. Conventional WLAN architecture includes a router connected to one or more wireless access points. Further, a wireless controller may be connected to the WLAN to control and manage the wireless access points. Certain areas within a corporate and campus environment are not conducive for a wireless client to connect to a wireless access point. This may be due to a blocked line of sight between the client and wireless access point antenna, interference from other clients and RF sources, the distance between client and wireless access point antenna being too great, or other environmental conditions. Thus, for many WLANs, information technology (IT) personnel have chosen to install external antennas across such environments to connect to the wireless access points, either remotely or physically.

SUMMARY

Embodiments of the present application describe management of antenna connections to a wireless network. In one embodiment, a method includes receiving antenna information from an antenna. For example, the antenna information can be received at a wireless controller of a wireless network. Configuration information is accessed from a database coupled to the wireless controller, where this information includes suitable antenna characteristics for use with the wireless network. The received antenna information and the configuration information are then compared, and instructions are provided to cause the antenna to be connected to or disconnected from the wireless network based on the comparison between the antenna information and the configuration information.

In another embodiment, a device includes a storage device storing configuration information including suitable antenna characteristics for use with a wireless network. A processor accesses the storage device and receives antenna information from an antenna. The process accesses the configuration information on the storage device and compares the antenna information with the configuration information. The process provides instructions to cause the antenna to be connected to or disconnected from the wireless network based on the comparison between the antenna information and the configuration information.

In another embodiment, a method includes receiving antenna information from an antenna at a wireless access point of a wireless network. The antenna information describes one or more characteristics of the antenna, and is provided to a wireless controller of the wireless network. Instructions are received from the wireless controller indicating whether the antenna is to be connected to or disconnected from the wireless network based on a comparison between the antenna information and antenna configuration information. If the instructions indicate connection, the antenna is connected to the wireless network or an existing connection is maintained. If the instructions indicate disconnection, the antenna is disconnected from the wireless network or an existing disconnection is maintained.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
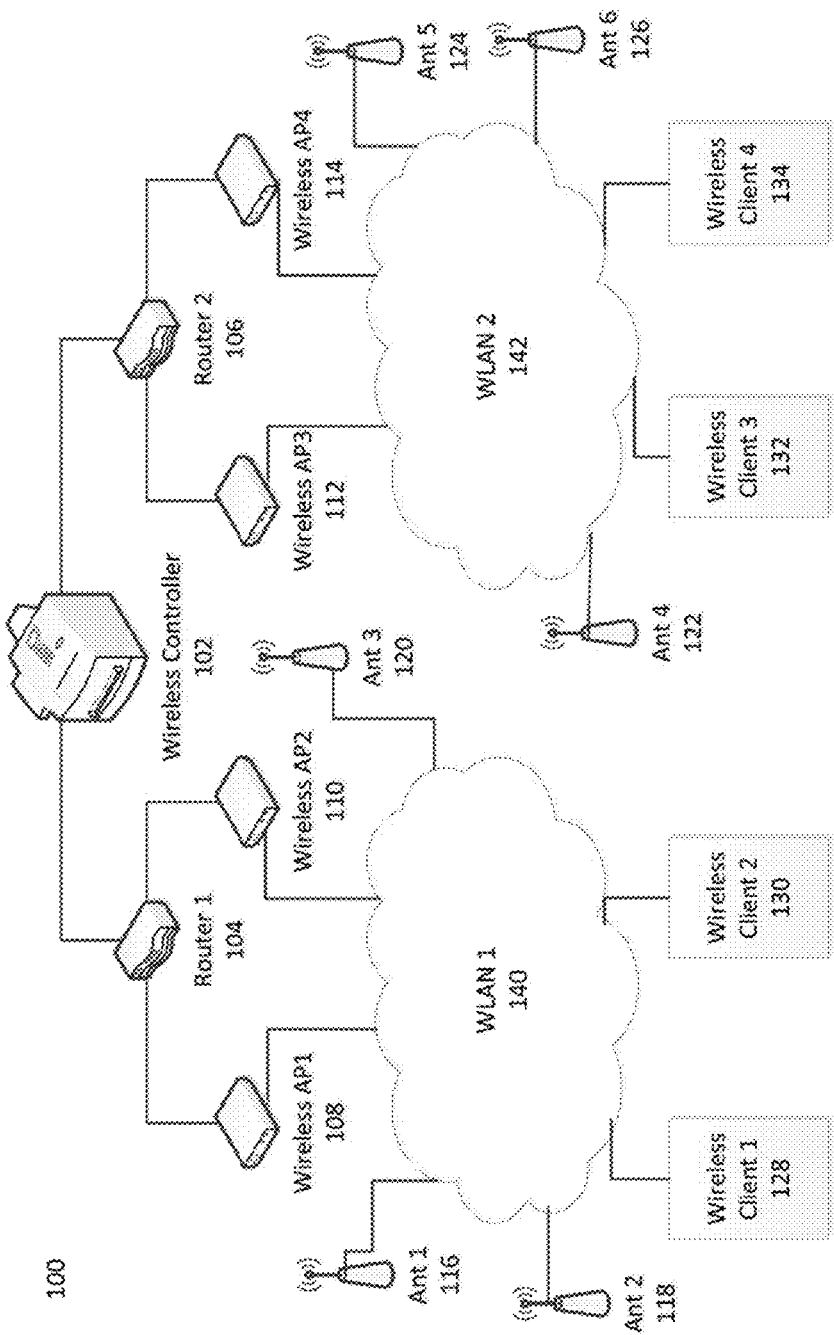
FIG. 1 is a block diagram of an example wireless local area network according to one embodiment.

One or more embodiments described herein relate to management of antennas in a wireless network, including establishing and maintaining network connections to properly-configured antennas. In some embodiments, an antenna can communicate information describing the antenna that is received by a wireless controller. The controller compares the antenna information to configuration information including suitable antenna characteristics for use with the wireless network, to determine whether or not the antenna is properly configured for use in the network. If the antenna is not suitable, the controller can instruct that the antenna be decoupled and that a different antenna be coupled to the wireless network.

Embodiments can be implemented in a system including a wireless network and wireless clients connecting to the wireless network. For example, in some embodiments, wireless access points may be installed such that wireless clients have access to the wireless network and other connected networks, such as the Internet, from any location. Further, wireless access points may need to be connected or coupled to external antennas in order to provide improved line of sight, reduce interference, or decrease the distance or range to wireless clients that have need to access the wireless network or the Internet. Due to compliance standards, wireless access points may need to access industry/standard compliant external antennas. Therefore, some embodiments may include an identification module coupled to an external antenna that is coupled to the wireless access point. An example identification module may be a radio frequency identification (RFID) module. However, the identification module may be any device that stores identification information associated with a given antenna. The identification module may transmit such antenna information wirelessly (e.g., via radio, Bluetooth, etc.) or through a wired connection. Further, the wireless access point may have a receiver to access or receive the antenna information from the identification module. If the identification module on the antenna is an RFID module, the receiver on the wireless access point may be an RFID reader. Although embodiments herein are described in the context of an RFID module and an RFID reader, embodiments can also apply to other types of identification modules and receivers, respectively. In some example embodiments, once the receiver of the wireless access point accesses the antenna information from the identification module, the wireless access point may forward the antenna information to a wireless controller coupled to a database. The wireless controller may access the database to find antenna configuration information for the antenna, where that information describes a suitable configuration of the antenna when used with the wireless network, such as being compliant to known industry standards relevant to the wireless network. The controller can determine whether the received antenna information matches the antenna configuration information from the database. If so, the wireless controller may provide instructions to the wireless access point to maintain connection or access to the external antenna. If not, the wireless controller may provide alternate instructions to the wireless access point to decouple from the external antenna and access or connect to another external antenna.

FIG. 1 is a block diagram 100 of an example wireless local area network according to one embodiment. The wireless local area network may have multiple subnetworks and cover more than one area of a physical location, such as more than one room, floor, etc. of a building, campus, corporate environment, or other environment. The wireless local area network shown FIG. 1 includes two separate wireless local area subnetworks 140 and 142. Each subnetwork is coupled to two wireless access points 108, 110, 112, and 114 and three external antennas 116, 118, 120, 122, 124, and 126. Each wireless access point 108, 110, 112, and 114 is coupled to a router 104 and 106. A wireless controller 102 is coupled to the wireless access points 108, 110, 112, and 114 indirectly through the routers 104 and 106. Wireless clients 128, 130, 132, and 134 are coupled or connected to the wireless access points 108, 110, 112, and 114 through one of the antennas 116, 118, 120, 122, 124, and 126 over a wireless local area subnetwork 140 or 142, as shown. Each of these antennas can be external to the other components of the network, e.g., external to the wireless access points and wireless controller.

A wireless access point 108, 110, 112, and 114 may be configured such that it accesses and uses one of the connected external antennas 116, 118, and 120, or 122, 124, and 126 through the wireless local area subnetwork so as to provide better connectivity to the wireless clients 128, 130, 132, and 134. Any one of the antennas 116, 118, 120, 122, 124, and 126 may increase the wireless signal power levels and thereby the range of a wireless access point 108, 110, 112, and 114 to a wireless client 128, 130, 132, and 134. Also, an antenna 116, 118, 120, 122, 124, and 126 may provide a better line of sight or less interference to better establish a connection with the wireless client 128, 130, 132, and 134.

Each wireless access point uses an antenna suitably and correctly configured for the wireless network. For example, in some embodiments, the wireless access point accesses or uses an antenna that conforms to the rules governing its operating standards and rules of the FCC, e.g., rules related to broadcasting signals. In some embodiments, each antenna may have an RFID module that stores antenna information including one or more antenna characteristics or specification information. The module sends the antenna information to the wireless controller 102 to determine whether the antenna is suitably configured for operation with the wireless network and to comply with standards' rules and the FCC. In some embodiments, the antennas and the wireless access points can communicate with each other using a communication channel separate from the wireless network. For example, the wireless access points 108, 110, 112, and 114 may each have a receiver such as an RFID reader to receive and access antenna information stored on the RFID module on each antenna 116, 118, 120, 122, 124, and 126. The wireless access points 108, 110, 112, and 114 may, in turn, transmit received antenna information to the wireless controller 102. The wireless controller 102 may determine whether the received antenna information complies with the FCC rules and its operating standards. In some embodiments, the wireless controller 102 determines such compliance by comparing the received antenna information with accessed antenna configuration information, which can be stored on a connected storage device such as a database. If the received antenna information matches the antenna configuration information then wireless controller 102 may provide instructions to the wireless access point to maintain connection and access to the antenna, or to connect to the antenna (if not already connected to the wireless network). However, if the received antenna information does not match the antenna configuration information then wireless controller 102 may provide instructions for the wireless access point to decouple or disconnect from the respective external antenna (or maintain disconnection if the antenna is not already connected to the wireless network) and connect to or access another external antenna.

In some embodiments, the antenna information provided by the identification module may include a type of the antenna, one or more frequencies at which the antenna receives data, and a signal range for the antenna. Similarly, the antenna configuration information stored in the database may include a configured antenna type, one or more configured frequencies at which the antenna receives data, and a configured signal range for the antenna. The antenna can be any type that includes, but is not limited to, directional antenna, omni-directional antenna, point-to-point antenna, point-to-multipoint antenna, home office, mobile WiFi, Yagi antenna, Backfire antenna, and parabolic antenna.

One of ordinary skill in the art can recognize that to extend the range of a wireless access point's connectivity to a wireless client, installing one or more external antennas may be required. Further, the external antennas may be coupled to the wireless access point, thereby extending wireless network and Internet access to areas of the physical location (e.g., room, floor, etc. of a corporate environment) that otherwise may not have access. Such an external antenna may have increased gain and directional or omni-directional qualities. Directional antennas are used for point-to-point or sometimes for multi-point systems, depending on the wireless environment. Omni-directional antennas are a common "base" antenna used for point-to-multi-point systems. For example, an omni-directional antenna can serve as primary antenna to distribute wireless signals to other computers or devices (such as wireless printers, PDAs, etc.) in a corporate environment.

Point-to-point systems usually involve two different wireless access points. If a wireless access point is across a long RF valley and the WLAN architecture is designed for multiple users to share the connection with multiple users on the other side of the valley, then external antennas may be configured as a multi-point system using directional antennas. Point-to-multi-point systems are often used in WLAN environments.

The range of the wireless signal using external antennas may depend on several factors, including power output of a wireless card on a wireless client or router, receiver sensitivity of the wireless cards (or other devices) receiving signals, and obstructions which may inhibit the transmission path.

Yagi antennas are typically very directional and are used for point-to-point signals, or to extend the range of a point-to-multi-point system. Another antenna type is a backfire antenna, which is a small directional antenna with increased gain, and may have a parabolic dish shape. Backfire antennas can be used for point-to-point or point-to-multipoint systems because of their increased gain and increased signal-to-noise ratios. Traditionally, parabolic dish antennas output high gain but may be difficult to maintain connectivity, because as the gain of an antenna increases, the antenna's radiation pattern decreases until a relatively small window remains to point or aim the antenna to wireless client locations. Dish antennas can be used for a point-to-point system for long haul systems. Parabolic dish antennas work by focusing the power to a central point and beaming the radio's signal to a specific area. These antennas are highly focused and are suitable for long range applications.

The gain necessary for each individual WiFi antenna system may depend on line of sight obstruction, range, distance, and/or the receive strength or sensitivity of wireless cards or other receiver devices. Further, as with all radio systems, interference may be an issue. Foreign sources that may cause interference with WiFi systems include microwave ovens, certain lighting systems, other 802.11 access points or systems, microwave transmitters, and high speed processors for computers.

The characteristics of the different types of antennas described herein show that different antennas may be suitable for different conditions to increase the range of connectivity to wireless clients in certain physical areas that otherwise may not have access to the wireless network or the Internet.

Figure 2:
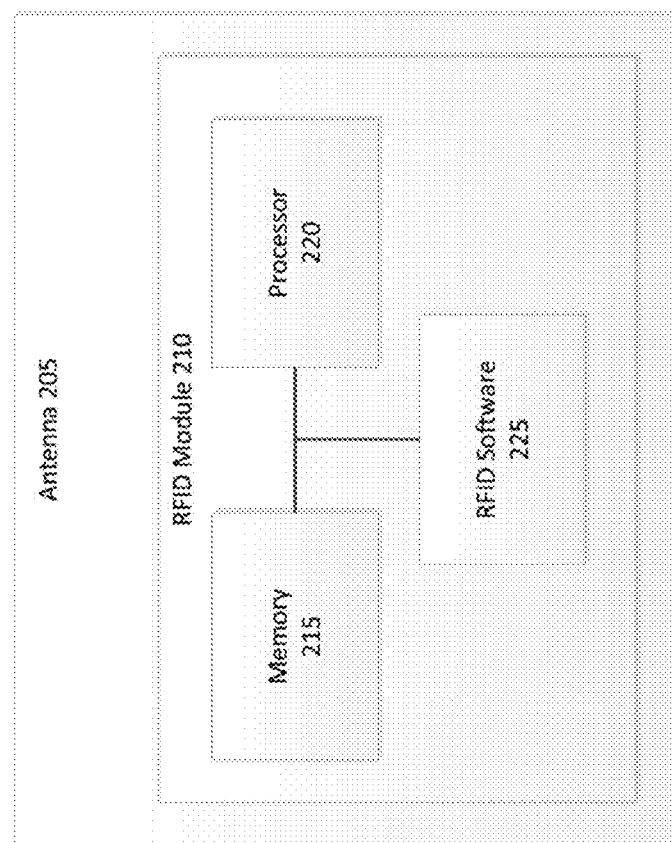
FIG. 2 is a block diagram of an example antenna according to one embodiment.

FIG. 2 is a block diagram 200 of an example antenna 205 according to one embodiment. The antenna 205 may be an external antenna connected to a wireless access point to provide better connectivity to one or more wireless clients. As described herein, the wireless access point may retrieve antenna information describing or otherwise associated with the antenna 205, which includes characteristics (e.g. specification information) of the antenna such as a type of the antenna 205, one or more frequencies at which the antenna receives data, a range for the antenna, and/or any other antenna specifications. In some embodiments, this antenna information is stored in an identification module on (or closely connected to) the antenna 205. For example, the identification module can be an RFID module 210 provided on the antenna. The RFID module 210 (which can be an RFID tag) may include a processor 220 as well as a memory 215 that stores the antenna information. When communicating with a wireless access point requesting the antenna information, RFID software 225 embedded in the RFID module may assist in transferring the antenna information to the wireless access point. The wireless access point may relay such information to a wireless controller so that the wireless controller may determine whether the antenna is suitable for use in the wireless network system.

Figure 3:
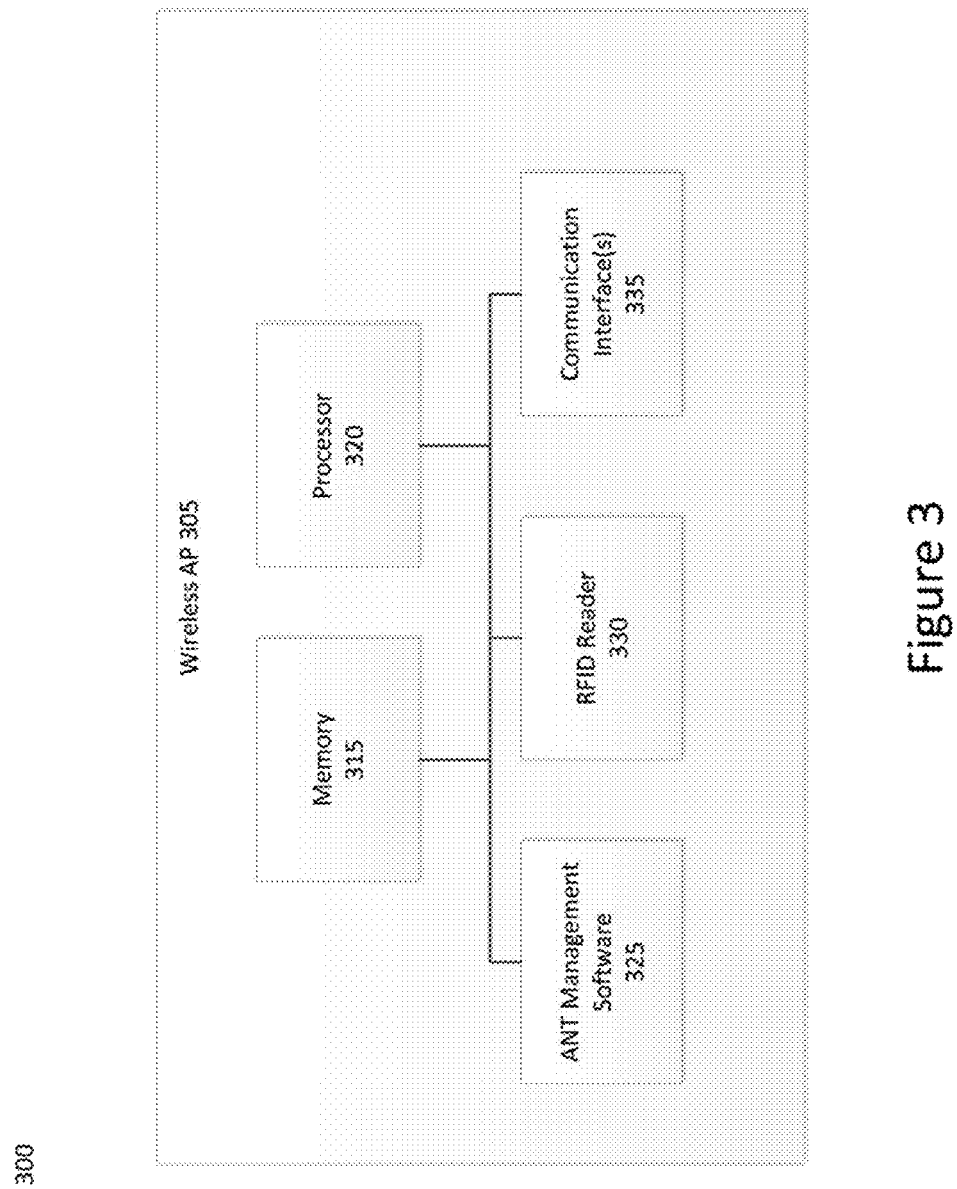
FIG. 3 is a block diagram of a wireless access point according to one embodiment.

FIG. 3 is a block diagram 300 of a wireless access point 305 according to one embodiment. Such a wireless access point may include one or more components such as a RFID reader 330 (or other receiver), a memory 315, a processor 320 and antenna management software 325. Further, the wireless access point 305 may include one or more communication interfaces 335 to allow the wireless access point 305 to communicate to other devices such as one or more antennas (e.g., external), wireless clients, routers, wireless controllers, etc. across a wireless network such as a WLAN.

The wireless access point 305 may be used to retrieve the antenna information stored in the identification module of an antenna using the RFID reader 330. The antenna management software 325 may be used to send the antenna information to the wireless controller through one or more communication interfaces such that the wireless controller can determine whether the antenna is correctly configured for the network, e.g., complies with rules and FCC regulations. The wireless access point 305 may receive instructions from the wireless controller to decouple or disconnect the wireless access point from the antenna based on the received antenna information not matching the stored antenna configuration information. Alternatively, the wireless access point 305 may receive instructions from the wireless controller to maintain connectivity of the wireless access point to the antenna (or to connect the wireless access point to the antenna) based on the received antenna information matching the stored antenna configuration information. The management of the decoupling or maintaining the connectivity to the antenna may be performed by the antenna management software 325.

Figure 4:
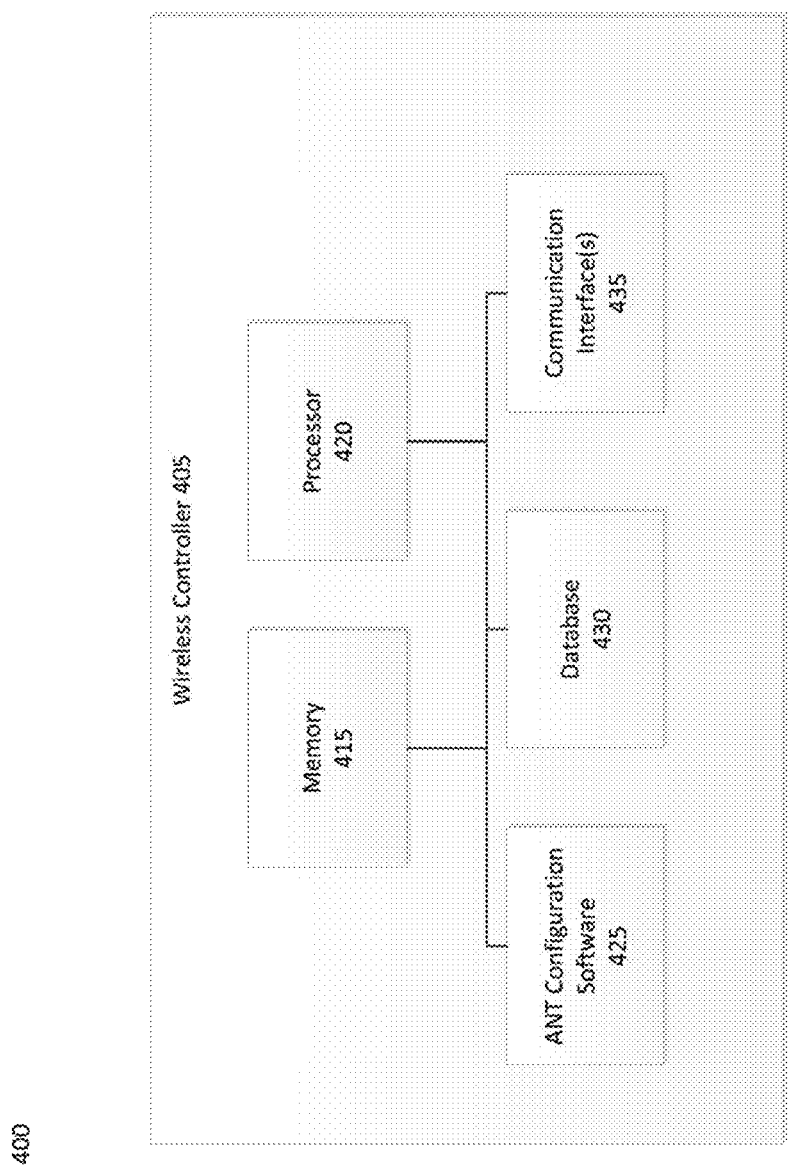
FIG. 4 is a block diagram of a wireless controller according to one embodiment.

FIG. 4 is a block diagram 400 of a wireless controller 405 according to one embodiment. Wireless controller 405 may include several components such as a memory 415, a processor 420, and antenna configuration software 425. In some embodiments, the wireless controller 405 may have a database 430 residing in its memory or in connected memory (such as memory 415), where the database 430 stores antenna configuration information. Alternate embodiments may have the database 430 housed in a separate device and coupled to the wireless controller 405.

Wireless controller 405 includes one or more communication interfaces 435 that enable communication with other wireless clients, wireless access points, and routers across the WLAN. The wireless controller 405 may receive antenna information from the wireless access point that was retrieved from an identification module residing on a connected or accessible external antenna, where the received antenna information describes operating characteristics of a connected (or accessible) antenna. In other embodiments, the wireless controller 405 can receive the antenna information from other components or from the antenna itself. Using the antenna configuration software, the wireless controller 405 can determine whether the received antenna information complies with operating standards and FCC rules based on a comparison with suitable antenna configuration information stored in the database 430.

The antenna configuration information stored in database 430 can includes characteristics, specifications and/or other antenna information that is considered compliant with the operation of wireless network and/or industry standards and rules. In some embodiments, wireless network standards can require particular antenna characteristics. Some embodiments can require antenna compliance with FCC rules for broadcasting wireless signals. In some examples, the stored configuration information can include one or more types of antenna characteristics suitable for operation with the wireless network. These characteristics can include one or more types of antennas that are known to function properly with the particular implementation of the wireless network as well as known to be compliant with relevant standards and rules. The stored configuration information can also include one or more frequencies, or frequency ranges, at which the antenna should operate to be compliant with the wireless network and relevant standards and rules. Furthermore, the stored configuration information can include a signal range at which the antenna should be able to transmit and/or receive signals to be compliant with the wireless network and relevant standards and rules. Additional and/or other antenna configuration information can be stored in other embodiments, e.g., characteristics (specification information) related to signal transmission and/or reception, signal power, transmitted or received signal noise, physical dimensions, and/or other characteristics of one or more antennas suitable for operation with the wireless network. In some embodiments, different antenna configuration information can be stored for different particular wireless access points or other components of the wireless network system, and in such cases identifying information can be received by the wireless controller to identify the particular wireless access point and/or particular antenna.

The wireless controller 405 compares the received antenna information to the stored antenna configuration information. In some embodiments, the controller 405 compares each antenna characteristic of the received antenna information to corresponding characteristics of the stored configuration information. For example, the received antenna characteristics can be compared to each of the stored antenna types, frequency ranges, signal ranges, etc., or compared to each set of these characteristics. These comparisons are performed until a match is found for each received characteristic or set of characteristics, or until all stored configuration information has been compared and a match is not found for one or more of the characteristics. The wireless controller 405 may provide instructions to the wireless access point to decouple or disconnect the wireless access point from the antenna based on the associated antenna information not matching the antenna configuration information. Alternatively, the wireless controller 405 may provide instructions to the wireless access point to maintain connectivity to the antenna (or connect to the antenna if not already connected) based on the associated antenna information matching the antenna configuration information.

In some embodiments, the wireless access controller can connect multiple antennas to the wireless network. Each such antenna is checked to match with the stored configuration information and is disconnected or not connected if a match is not found.

Figure 5:
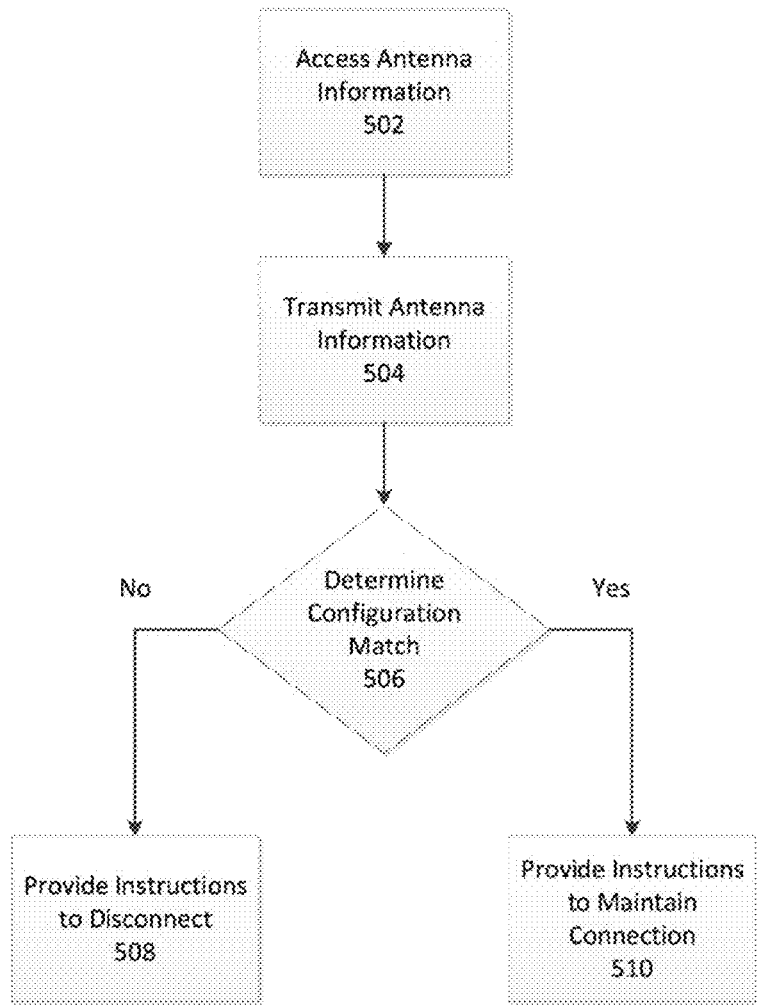
FIG. 5 is a flowchart of an example method according to one embodiment.

FIG. 5 is a flowchart 500 of an example method according to one embodiment. In one step of the example method, a wireless access point can access and receive antenna information from an identification module of an external antenna using a receiver of the wireless access point, as shown in block 502. A further step may include transmitting the antenna information to a wireless controller in the WLAN, as shown in block 504. At decision 506, the wireless controller accesses antenna configuration information from a database and determines whether the antenna information matches the accessed antenna configuration information, where a match indicates that the antenna is in compliance with appropriate operating standards and FCC rules as well as being otherwise suitable for use in the wireless network. If there is no such match, then the wireless access controller provides instructions to the wireless access point to decouple or disconnect the wireless access point from the antenna, as shown in block 508. In some cases, the antenna may not be already connected to the wireless access point, and the instructions can inform the wireless access point to maintain this disconnected state (and/or instructions such as an acknowledgement can be sent back to the wireless access point, causing no action).

If there is a match, the wireless controller provides instructions to the wireless access point to maintain connectivity to the antenna, as shown in block 510. In some cases, the antenna may not already be connected to the wireless network, and the instructions cause the wireless access point to connect the antenna to the wireless network (such as to connect to the wireless access point).

In some embodiments, after block 508 or 510, the method can return to block 502 to receive antenna information from a different antenna having communication with the wireless access point and/or wireless controller, and the following steps can determine whether this different antenna is suitable for connection to the wireless network and, if so, perform the appropriate connection or disconnection. Thus, multiple antennas can be similarly checked.

In the foregoing detailed description, reference is made to the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts, and accompanying written description. While these details are helpful to explain one or more embodiments, those skilled in the art will understand that these specific details are not required in order to practice the embodiments.

Note that the functional blocks, methods, devices and systems described in the present disclosure may be integrated or divided into different combination of systems, devices, and functional blocks as would be known to those skilled in the art.

In general, it should be understood that the devices and circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using one or more general purpose or dedicated processors running a software application through one or more volatile or non-volatile memories. Also, the hardware objects could communicate using electrical signals, with states of the signals representing different data.

It should be further understood that this and other arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    receiving antenna information from an antenna, wherein the antenna information is received at a wireless controller of a wireless network;
    accessing antenna configuration information from a database coupled to the wireless controller, wherein the antenna configuration information includes suitable antenna characteristics for use with the wireless network, and wherein the suitable antenna characteristics are compliant with one or more of operation of the wireless network and industry standards and rules;
    comparing the antenna information and the antenna configuration information;
    determining from the comparing of the antenna information and the antenna configuration information that antenna characteristics and antenna specifications included in the received antenna information comply with the operation of the wireless network and the industry standards and rules; and
    providing instructions to cause the antenna to be connected to or disconnected from the wireless network based on the comparison between the antenna information and the antenna configuration information.

2. The method of claim 1, further comprising:
    determining that the antenna information does not match the antenna configuration information based on the comparison of the antenna information and the antenna configuration information, and
    wherein the providing instructions cause the antenna to be disconnected from the wireless network.

3. The method of claim 1, further comprising:
    determining that the antenna information matches the antenna configuration information based on the comparison of the antenna information and the antenna configuration information; and
    wherein the providing instructions cause the antenna to be connected to the wireless network.

4. The method of claim 1, further comprising determining whether the antenna information matches the antenna configuration information, and wherein the providing instructions includes:
    in response to the antenna information matching the antenna configuration information, providing instructions to maintain a connection of the antenna to the wireless network or to connect the antenna to the wireless network; and
    in response to the antenna information not matching the antenna configuration information, providing instructions to disconnect the antenna from the wireless network or to not connect the antenna to the wireless network.

5. The method of claim 1, wherein the antenna is a first antenna, and further comprising:

determining that the first antenna is to be disconnected from the wireless network based on the comparison between the antenna information and the antenna configuration information; and connecting a second antenna to the wireless network.

6. The method of claim 1, wherein the wireless controller is coupled to a wireless access point, and wherein the antenna information is received from the wireless access point and the instructions are provided to the wireless access point.

7. The method of claim 1, wherein the antenna information is received using a communication channel separate from the wireless network.

8. The method of claim 1, wherein the antenna information is received from a radio frequency identification (RFID) module provided on the antenna.

9. The method of claim 1, wherein the antenna information and the suitable antenna characteristics for use with the wireless network include at least one of: an antenna type, an antenna operating frequency range, and an antenna signal range.

10. The method of claim 1, wherein the antenna characteristics comprise one or more types of antennas that are known to function properly with the particular wireless network.

11. The method of claim 1, wherein the suitable antenna characteristics for use with the wireless network are compliant with Federal Communications Commission (FCC) rules.

12. A device comprising:
a storage device that stores antenna configuration information including suitable antenna characteristics for use with a wireless network; and
at least one processor accessing the storage device and operative to perform operations comprising:
receiving antenna information from an antenna;
accessing the antenna configuration information stored by the storage device, wherein the antenna configuration information includes suitable antenna characteristics for use with the wireless network, and wherein the suitable antenna characteristics are compliant with one or more of operation of the wireless network and industry standards and rules;
comparing the antenna information with the antenna configuration information;
determining from the comparing of the antenna information and the antenna configuration information that antenna characteristics and antenna specifications included in the received antenna information comply with the operation of the wireless network and the industry standards and rules; and
providing instructions to cause the antenna to be connected to or disconnected from the wireless network based on the comparison between the antenna information and the antenna configuration information.

13. The device of claim 12, wherein the processor further determines whether the antenna information matches the antenna configuration information, and wherein the providing instructions includes:
in response to the antenna information matching the antenna configuration information, providing instructions to maintain a connection of the antenna to the wireless network or to connect the antenna to the wireless network; and
in response to the antenna information not matching the antenna configuration information, providing instructions to disconnect the antenna from the wireless network or not connect the antenna to the wireless network and to connecting a second antenna to the wireless network.

14. The device of claim 12, wherein the antenna information is received from a wireless access point of the wireless network, and the instructions are provided to the wireless access point.

15. The device of claim 12, wherein the antenna information is received using a communication channel coupled between the antenna and the wireless access point, the communication channel being separate from the wireless network.

16. The device of claim 12, wherein the antenna information and the suitable antenna characteristics for use with the wireless network include at least one of: an antenna type, an antenna operating frequency range, and an antenna signal range.

17. A method comprising:
receiving antenna information from an antenna, wherein the antenna information is received at a wireless access point of a wireless network and describes one or more characteristics of the antenna;
providing the antenna information to a wireless controller of the wireless network, wherein the wireless controller determines from a comparison between the antenna information and the antenna configuration information that antenna characteristics and antenna specifications included in the received antenna information comply with operation of the wireless network and industry standards and rules;
receiving instructions from the wireless controller indicating whether the antenna is to be connected to or disconnected from the wireless network based on the comparison between the antenna information and antenna configuration information, wherein the antenna configuration information includes suitable antenna characteristics for use with the wireless network, and wherein the suitable antenna characteristics are compliant with one or more of operation of the wireless network and the industry standards and rules;
connecting the antenna, or maintaining connection of the antenna, to the wireless network in response to the instructions indicating the connection; and
disconnecting the antenna, or maintaining disconnection of the antenna, from the wireless network in response to the instructions indicating the disconnection.

18. The method of claim 17, wherein the antenna information is received over a communication channel between the antenna and the wireless access point, wherein the communication channel is separate from the wireless network.

19. The method of claim 18, wherein the communication channel includes an RFID module provided on the antenna and an RFID receiver provided on the wireless access point.

20. The method of claim 17, wherein the antenna information includes at least one of: an antenna type, an antenna operating frequency range, and an antenna signal range.

21. A system comprising:
a first antenna;
a wireless access point coupled to the first antenna;
an identification module coupled to the first antenna;
a second antenna;
a receiver coupled to the wireless access point, wherein the receiver communicates with the identification module and receives first antenna information from the identification module;
a wireless controller coupled to the wireless access point, wherein the wireless controller determines from a comparison between the first antenna information and antenna configuration information that antenna characteristics and antenna specifications included in the first antenna information comply with operation of the wireless network and industry standards and rules; and a database coupled to the wireless controller and storing the antenna configuration information, wherein the antenna configuration information includes suitable antenna characteristics for use with the wireless network, wherein the suitable antenna characteristics are compliant with one or more of operation of the wireless network and industry standards and rules, wherein the receiver transmits the first antenna information to the wireless controller, and wherein the wireless controller compares the first antenna information to the antenna configuration information, and, based on the comparison, the wireless controller provides instructions to the wireless access point to couple to the first antenna or decouple from the first antenna and access the second antenna.

* * * * *